Jan. 21, 1947.　　J. R. BENFORD ET AL　　2,414,709
MICROSCOPE
Filed Feb. 26, 1944

JAMES R. BENFORD
LEON V. FOSTER
INVENTORS
BY
ATTORNEYS

Patented Jan. 21, 1947

2,414,709

UNITED STATES PATENT OFFICE 2,414,709

MICROSCOPE

James R. Benford, Rochester, and Leon V. Foster, Irondequoit, N. Y., assignors to Bausch & Lomb Optical Company, Rochester, N. Y., a corporation of New York Application February 26, 1944, Serial No. 524,004

1 Claim. (Cl. 88—39)

This invention relates to microscopes and more particularly to a miscroscope employing polarized light.

In the petrographical and other microscopes heretofore proposed in which the subject under examination was illuminated with polarized light, the analyzer would not give complete extinction over the entire objective aperture, resulting in incomplete or grayish extinction in the field. This is due to the fact that glass surfaces angularly disposed in a beam of light act as partial polarizers because of the unequal transmission coefficients for light vibrating in the plane of incidence and for light vibrating normal to the plane of incidence. Thus the surface of all lenses disposed between the polarizing element and the analyzer act as partial polarizers at all points on the surface other than the vertices thereof where the light is incident normally and is transmitted without change in the state of polarization.

As partial polarizers also rotate the plane of polarization of a beam of polarized light, each surface in the optical system of a polarizing microscope between the polarizing element and the analyzer presents a variety of angles of incidence and planes of incidence and hence each surface will tend to rotate the vibration plane of the light. The amount of this rotation will vary from vertex to periphery of each surface due to the varying angles of incidence. As the angles of incidence will increase from the vertices outwardly of the lenses, the difference between the transmission coefficients will also proportionally increase. Thus the rotation of the plane of polarization increases as the angles of incidence increases so that the aperture, when viewed through an analyzer crossed with the polarizer, appears dark at the center and the remainder of the aperture varies in intensity from the inner portion thereof outwardly to the edge.

However, both the amount and direction of this rotation will also vary around the lens surface, the amount of rotation reducing to zero when the plane of the incident amplitude coincides in direction with the plane of vibration of either the polarizer or the analyzer, and the direction of the rotation will also vary from point to point around the lens surface, being always toward the plane of incidence. The combination of these two effects results in two dark elongated areas, which are at 90° to each other when polarizer and analyzer are crossed, and which form what is commonly referred to as the "dark cross." This cross is formed due to the two 90° azimuths in which the incident plane polarized light is not rotated.

The primary object of the present invention is to provide a microscope in which the aperture will be uniformly dark when the same is viewed through an analyzer crossed with a polarizing element. This is accomplished by the present invention by providing on each surface between the polarizing element and the analyzer an interference film having such an index of refraction relative to the index of refraction of the glass that the transmission coefficients for light vibrating in the plane of incidence and for light vibrating normal to the plane of incidence are substantially equal. Thus the air glass surface no longer acts as a partial polarizer and the lens surface will not produce the light areas between the crossed elongate dark areas of prior microscopes. The aperture of the microscope of the present invention is uniformly dark for the analyzer can produce total extinction throughout the same.

Other features and advantages of the present invention will appear from the following description taken in connection with the accompanying drawing in which.

The invention herein disclosed can be applied to any microscope employing polarized light and the invention is not to be limited to the particular optical system selected for illustrating one application of the invention.

It is known that a glass surface, when set at an angle to the direction of a light beam, acts as a partial polarizer due to unequal transmission coefficients for light vibrating in the plane of incidence commonly termed the $p$ component, and for light vibrating normal to the plane of incidence and generally termed the $s$ component. The expressions for these two components can be given as:

$$D_p = E_p \frac{2 \sin a_2 \cos a_1}{\sin (a_1 + a_2) \cos (a_1 - a_2)} \qquad (1)$$

$$D_s = E_s \frac{2 \sin a_2 \cos a_1}{\sin (a_1 + a_2)} \qquad (2)$$

where $D_p$ and $D_s$ represent the $p$ and $s$ components of the transmitted amplitudes;

$E_p$ and $E_s$ are the $p$ and $s$ components of the incident amplitudes;

and $a_1$ and $a_2$ are the angles of incidence and refraction respectively.

It will be observed that the expression for $D_p$ differs from that for $D_s$ by the factor $\cos(a_1-a_2)$ which appears in the denominator of the $D_p$ expression. This factor becomes unity only when both $a_1$ and $a_2$ equal 0°, that is, at normal incidence. Thus at normal incidence $D_p$ equals $D_s$. At grazing incidence $a_1$ equals 90° and hence both expressions become zero. At all angles of incidence other than 0° and 90° the two components are unequal and it is this difference which produces the partial polarizing effect of glass surfaces.

Figure 4:
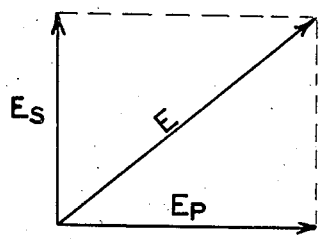
Figs. 4 and 5 are vector diagrams for explaining the rotation of the plane of vibration of polarized light.
Figure 5:
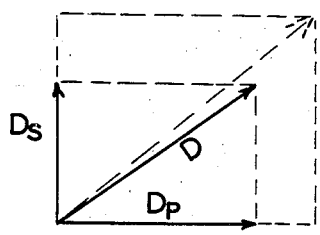

Since an inclined glass surface acts as a partial polarizer, it will also tend to rotate the plane of vibration of incident plane polarized light. This can be shown vectorially and referring now to Fig. 4 wherein the $E_p$ component of the incident amplitude E has been shown as larger than the $E_s$ component, it will be seen from Fig. 5 that this difference results in a larger $D_p$ component and causes the resultant transmitted amplitude D to be rotated away from E and toward the plane of incidence.

Thus it will be seen that any lens between crossed polarizer and analyzer will tend to rotate the plane of vibration at all points on its surface other than the vertex. As the light is normal to the surface at the vertex, the $p$ and $s$ components are equal and the light will be transmitted without a change in its state of polarization. As the angles of incidence of the light will increase as one progresses from the vertex to the periphery of a lens, the difference between the $p$ and $s$ component will also become greater as will be evident from Equations 1 and 2. Thus the rotation of the plane of polarization increases toward the periphery of the lens so that when the lens is viewed through an analyzer crossed with a polarizer, the center should appear dark while the marginal portion will be relatively bright.

Both the amount and the direction of rotation, however, will also vary around the lens and, referring again to Fig. 4, if the incident amplitude E is made to coincide with the plane of incidence, it will be seen that the incident amplitude will equal $E_p$ and the component $E_s$ becomes zero. Hence, from the Equation 2 $D_s$ equals zero and the transmitted amplitude D coincides in direction with the incident amplitude E, that is, there will be no rotation of the vibration direction in this azimuth. A similar condition exists 90° away from this position where E coincides with $E_s$ and $E_p$ equals zero. It can then be derived from Equation 1 that $D_p$ will equal zero and the transmittant amplitude D coincides in direction with the incident amplitude E and there is again no rotation of the vibration direction.

Figure 1:
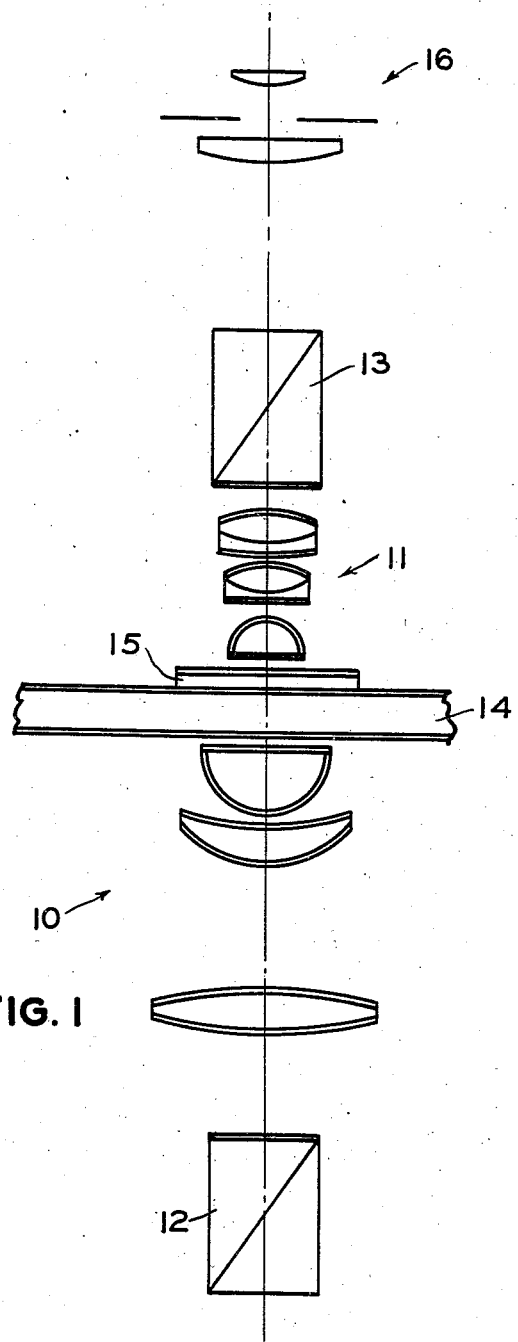
Fig. 1 is a diagrammatical view of the optical elements of the microscope of the present invention.
Figure 2:
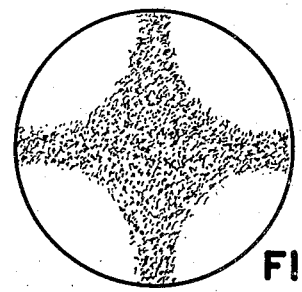
Fig. 2 is a schematic showing of the aperture as viewed in a prior microscope employing polarized light.

Thus across the face of each lens of the microscope schematically shown in Fig. 1, two 90° azimuths exist in which the incident plane of polarized light is not rotated and along these azimuths any lens will appear dark between crossed nicols. As the light striking the lens surfaces coincident with or closely adjacent the optical axis of the microscope will not have its state of polarization changed, it will be evident that at the center and along the two azimuths, the aperture will appear dark as shown in Fig. 2 and that in between the bars of the cross produced the aperture will become brighter as the edge of the aperture is approached.

This inherent defect in prior microscopes using polarized light has not only complicated the use of the same but has also decreased the efficiency of the same. An instrument made in accordance with the present invention does not have this inherent defect for the so called "dark cross" has been eliminated.

It can be shown that if each air-glass surface between the polarizing element and analyzer of a microscope be coated with a transparent film having a predetermined index of refraction relative to the index of refraction of the glass of the element such that the $p$ and $s$ components are caused to be equal, the air glass surface will no longer act as a partial polarizer.

It will be appreciated that in a complicated lens combination such as the condenser 10 and the micro objective 11 shown in Fig. 1, it will not always be practical to employ a film whose index will bring about the exact result desired. It can be shown, however, that for a quarter wave film of index $N_2$ between two transparent media of indices $N_1$ and $N_3$ respectively, the $p$ and $s$ amplitude reflectances are:

$$R_p = \frac{N_2^2 \cos a_1 \cos a_3 - N_1 N_3 \cos^2 a_2}{N_2^2 \cos a_1 \cos a_3 + N_1 N_3 \cos^2 a_2} \quad (3)$$

$$R_s = \frac{N_1 N_3 \cos a_1 \cos a_3 - N_2^2 \cos^2 a_2}{N_1 N_3 \cos a_1 \cos a_3 + N_2^2 \cos^2 a_2} \quad (4)$$

where $a_1$ is the angle of incidence in medium one; $a_2$ and $a_3$ the angles of refraction in media two and three respectively.

It will be evident from Equations 3 and 4 that when $N_2^2$ equals $N_1 N_3$, $R_p$ will equal $R_s$. This means that if a quarter wave film of index $N_2$ be applied on an air glass surface where the index of the glass is:

$$N_3 = N_2^2 \quad (5)$$

the $p$ and $s$ reflection coefficients are equal and hence the $p$ and $s$ transmission coefficients must also be equal. Thus, if a quarter wave film is deposited on an air glass surface of a lens and the relation between the glass index and the film index is as expressed in Equation 5, this lens surface will cause no brightening in between crossed nicols.

Figure 3:
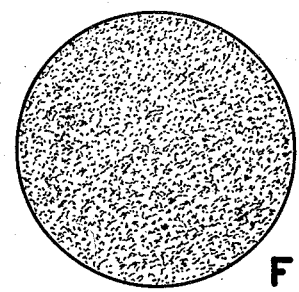
Fig. 3 is a view similar to Fig. 2 but showing the aperture as viewed in the microscope of the present invention.

As all glass surfaces between the polarizer 12 and the analyzer 13 will tend to rotate the plane, the opposite surfaces of the slide 14 and cover glass 15 should also be coated. Furthermore, as the exit face of the polarizer 12 and the entrance face of the analyzer 13 also act as partial polarizers, the same should be filmed to gain the maximum correction, although it should be obvious now that the eyepiece 16 need not be filmed. In order to obtain the maximum advantage of our invention, the most strongly curved air-glass surfaces should be filmed because they have the greatest effect as partial polarizers. Substantial benefits of the invention may, therefore, be attained even if the weaker curved air-glass surfaces are not filmed. This will be apparent from the foregoing discussion and equations. The aperture of a microscope having the surface coated as described herein appears in Fig. 3 and it will be seen that the same is uniformly dark.

The following tabulation based on calculations for a single air-glass surface using Equations 1, 2, 3, and 4 shows that a very substantial improvement can be made by filming all air glass surfaces between the polarizing element 12 and the analyzer 13 with cryolite having an index of 1.34. In this tabulation an angle of incidence of 40° and an azimuth at 45° to the plane of vibration of the polarizer have been assumed.

| Glass index | Filming note | Rotation of the pl. of vibration | Percentage trans. 3 crossed nicols |
|---|---|---|---|
| | | | Per cent |
| 1.720 | 1.34 film | 0° 3′ | 0.00008 |
| | No film | 1° 27′ | .06400 |
| 1.670 | 1.34 film | 0° 5′ | .00023 |
| | No film | 1° 20′ | .05430 |
| 1.523 | 1.34 film | 0° 15′ | .00194 |
| | No film | 1° 0′ | .03060 |

The ideal films for each of the three glasses indicated in the above table would have indices of 1.312, 1.292, and 1.234 respectively. However, as can be seen from the last column of the table, the cryolite film of index 1.34 produces a very substantial reduction toward the ideal 0% transmission through crossed nicols.

It will be apparent, therefore, that the benefits of our invention may be attained even though the refractive index of the film is not exactly equal to the square root of the refractive index of the material which carries the film. Such departures from equality will occur in the practical application of our invention and it is to be understood that such modifications fall within the scope of the claim which recites substantial equality of the index of the film with the square root of the index of the material.

Although the preferred embodiment of the present invention has been illustrated and described herein, it is to be understood that the invention need not be limited thereby but is susceptible of changes in form and detail within the scope of the appended claim.

We claim:

In a polarizing microscope, objective lens means, other lens means forming a condenser for directing light rays onto an object to be examined and into said objective lens means, a polarizing element for polarizing light rays before entering the condenser, an analyzer positioned to receive light rays after passage through the objective lens means and a thin transparent film of material carried by at least the most strongly curved surfaces of the condenser and objective lens means, said film having an optical thickness substantially equal to one quarter wave length of light and having a refractive index substantially equal to the square root of the refractive index of the material forming the lens means whereby light rays passing through said objective lens means are substantially completely polarized.

JAMES R. BENFORD.
LEON V. FOSTER.